United States Patent
Walters et al.

(10) Patent No.: US 11,467,848 B2
(45) Date of Patent: Oct. 11, 2022

(54) PORTABLE OPERATING SYSTEM AND PORTABLE USER DATA

(71) Applicant: Capital One Services, LLC, McLean, VA (US)

(72) Inventors: Austin Walters, Savoy, IL (US); Galen Rafferty, Mahomet, IL (US); Mark Watson, Sedona, AZ (US); Anh Truong, Champaign, IL (US); Vincent Pham, Champaign, IL (US); Reza Farivar, Champaign, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 233 days.

(21) Appl. No.: 16/868,950

(22) Filed: May 7, 2020

(65) Prior Publication Data
US 2021/0349733 A1    Nov. 11, 2021

(51) Int. Cl.
*G06F 9/4401* (2018.01)
*G06F 13/38* (2006.01)
(Continued)

(52) U.S. Cl.
CPC .......... *G06F 9/4411* (2013.01); *G06F 13/385* (2013.01); *G06F 21/60* (2013.01);
(Continued)

(58) Field of Classification Search
CPC ...... G06F 9/4411; G06F 13/385; G06F 21/60; G06F 21/602; G06F 2213/0026;
(Continued)

(56) References Cited

U.S. PATENT DOCUMENTS

| 5,128,996 A | 7/1992 | Rosenow et al. |
| 5,995,965 A | 11/1999 | Experton |

(Continued)

FOREIGN PATENT DOCUMENTS

| EP | 2299773 A1 | 3/2011 |
| WO | 2009106204 A1 | 9/2009 |

OTHER PUBLICATIONS

Stefan Etienne, The best hardware security keys for two-factor authentication, Webpage: The Verge, Last update May 15, 2019, 13 pages, Retrieved on May 4, 2020 from: <https://www.theverge.com/2019/2/22/18235173/the-best-hardware-security-keys-yubico-titan-key-u2f>.

(Continued)

*Primary Examiner* — Darren B Schwartz
(74) *Attorney, Agent, or Firm* — Banner & Witcoff, Ltd.

(57) ABSTRACT

Aspects described herein may relate to methods, systems, and apparatuses for allowing the access of user data across multiple devices. The access may be performed based on a portable hardware device that comprises an operating system and the user data. When the portable hardware device is inserted or otherwise connected to a computing device, the portable hardware device may, based on execution of the operating system, use or otherwise control one or more computing resources of the computing device. By this use and/or control of the one or more computing resources, the user data may be accessed. A computing platform may communicate with the portable hardware device and the computing device to manage the portable hardware device's access to the user data and monitor usage of computer resources by the portable hardware device.

20 Claims, 6 Drawing Sheets

(51) Int. Cl.
| | |
|---|---|
| *G06F 21/60* | (2013.01) |
| *G06Q 30/04* | (2012.01) |
| *H04L 9/06* | (2006.01) |
| *H04L 9/08* | (2006.01) |
| *H04L 9/00* | (2022.01) |
| *G06F 21/34* | (2013.01) |
| *G06F 21/44* | (2013.01) |
| *G06F 21/85* | (2013.01) |
| *H04L 9/32* | (2006.01) |

(52) U.S. Cl.
CPC ........... *G06F 21/602* (2013.01); *G06Q 30/04* (2013.01); *H04L 9/0637* (2013.01); *H04L 9/0819* (2013.01); *H04L 9/0891* (2013.01); *G06F 2213/0026* (2013.01); *H04L 9/50* (2022.05)

(58) Field of Classification Search
CPC .......... G06F 21/34; G06F 21/44; G06F 21/85; G06Q 30/04; H04L 9/0637; H04L 9/0819; H04L 9/0891; H04L 9/50; H04L 9/3239
See application file for complete search history.

(56) References Cited

U.S. PATENT DOCUMENTS

| | | | |
|---|---|---|---|
| 6,851,606 B2 | 2/2005 | Maenpaa et al. | |
| 8,988,194 B2 | 3/2015 | Lim | |
| 9,348,768 B2 | 5/2016 | Li | |
| 9,980,140 B1* | 5/2018 | Spencer | H04W 12/02 |
| 2006/0059194 A1* | 3/2006 | Oh | G06F 21/445 |
| 2006/0085639 A1* | 4/2006 | Phillips | H04L 9/3297 |
| | | | 713/168 |
| 2006/0147043 A1* | 7/2006 | Mann | H04L 9/0863 |
| | | | 380/270 |
| 2006/0190413 A1* | 8/2006 | Harper | H04L 67/01 |
| | | | 705/65 |
| 2007/0204335 A1* | 8/2007 | Zugenmaier | G06F 21/88 |
| | | | 726/9 |
| 2009/0158034 A1* | 6/2009 | Gu | H04W 12/069 |
| | | | 726/6 |
| 2010/0037063 A1* | 2/2010 | Chontos | G09C 1/00 |
| | | | 713/185 |
| 2010/0327054 A1* | 12/2010 | Hammad | G06F 21/42 |
| | | | 235/375 |
| 2011/0145592 A1* | 6/2011 | Greiner | G06F 21/602 |
| | | | 713/189 |
| 2011/0176675 A1* | 7/2011 | Hughes | H04L 9/0897 |
| | | | 380/44 |
| 2012/0155643 A1* | 6/2012 | Hassan | H04L 63/065 |
| | | | 380/270 |
| 2012/0324540 A1* | 12/2012 | Wu | G06F 1/266 |
| | | | 726/4 |
| 2013/0138950 A1* | 5/2013 | Kojima | H04W 12/0431 |
| | | | 713/153 |
| 2013/0268766 A1* | 10/2013 | Schrecker | G06F 21/34 |
| | | | 713/185 |
| 2014/0365694 A1* | 12/2014 | Bolton | H04W 8/005 |
| | | | 710/106 |
| 2015/0067196 A1* | 3/2015 | Little | G06F 9/44584 |
| | | | 710/14 |
| 2015/0304843 A1* | 10/2015 | Hillyard | G06F 8/654 |
| | | | 726/5 |
| 2016/0135045 A1* | 5/2016 | Lee | H04L 63/065 |
| | | | 726/9 |
| 2017/0126672 A1* | 5/2017 | Jang | H04W 4/80 |
| 2017/0171204 A1* | 6/2017 | Forood | H04W 4/80 |
| 2017/0308713 A1* | 10/2017 | Nagaratnam | H04L 9/0897 |
| 2019/0104448 A1* | 4/2019 | Abuan | H04L 65/403 |
| 2019/0303915 A1* | 10/2019 | Hammad | G06F 21/34 |
| 2020/0204526 A1* | 6/2020 | Gehret | H04W 12/06 |
| 2020/0382950 A1* | 12/2020 | Fornshell | H04W 4/80 |

OTHER PUBLICATIONS

F. Büsching, S. Schildt and L. Wolf, "DroidCluster: Towards Smartphone Cluster Computing—The Streets are Paved with Potential Computer Clusters," 2012 32nd International Conference on Distributed Computing Systems Workshops, Macau, 2012, pp. 114-117 [retrieved from <https://www.ibr.cs.tu-bs.de/papers/buesching-icdcs2012.pdf>].

Rent A Cluster, Webpage: Stack Overflow, Apr. 21, 2009, 5 pages, Retrieved May 4, 2020 from: <https://stackoverflow.com/questions/770831/rent-a-cluster>.

Buying computational resources vs. renting allocation on cluster, Webpage: Biostars, Bioinformatics Explained, 2015, 3 pages, Retrieved May 4, 2020 from: <https://www.biostars.org/p/172334/>.

Shan Y, Huang Y, Chen Y, Zhang Y. LegoOS: A disseminated, distributed {OS} for hardware resource disaggregation. In13th {USENIX} Symposium on Operating Systems Design and Implementation ({OSDI} 18) 2018 (pp. 69-87) [retrieved from <https://www.usenix.org/system/files/osdi18-shan.pdf>].

NixOS, The Purely Function Linux Distribution, 1 page, Retrieved May 7, 2020 from : <https://nixos.org/nixos/>.

* cited by examiner

PORTABLE OPERATING SYSTEM AND PORTABLE USER DATA

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many people today use multiple screens in connection with daily life. At various points throughout the day, someone might use a cellular phone, a laptop computer, and a tablet device. As usage of multiple devices increases, it may be beneficial to maintain, or port, a user's experience across the multiple devices. For example, a user's experience may be improved if an application's user interface appears and/or functions similarly on each of the multiple devices. To achieve the similar appearance and/or functionality on each of the multiple devices, the user might have to customize the application's settings on each device. As more and more data is spread across the multiple devices, maintaining a user's experience across the multiple devices may prove difficult. For example, a user might use tens or hundreds of different applications across the multiple devices, and maintaining the user's experience for that number of applications across each of the multiple devices would be a challenge. Thus, there is an ever-present need to improve the maintenance, or portability, of the user's experience across multiple devices.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects described herein may address one or more inadequacies in the maintenance, or portability, of a user's experience across multiple devices. Further, aspects described herein may address one or more other problems, and may generally improve systems that allow access to user data across multiple devices.

For example, aspects described herein may relate to allowing portable access to user data based on a portable hardware device. For example, the portable hardware device may include memory storing the user data in an encrypted form and an operating system. The portable hardware device may include a processor configured to execute the operating system. The portable hardware device may include a hardware interface configured to form a bus between a computing device and the portable hardware device when the portable hardware device is inserted into, or otherwise connected to, the computing device. The portable hardware device may be inserted into, or otherwise connect to, the computing device. When inserted, the portable hardware device may, based on execution of the operating system, use or otherwise control one or more computing resources of the computing device. By this use and/or control of the one or more computing resources, the user data may be accessed. For example, accessing the user data may include causing the computing device to execute an application stored by the portable hardware device.

Additional aspects described herein may relate to a computing platform that, among other things, manages the portable hardware device's access to the user data and monitors usage of computer resources by the portable hardware device. For example, the computing platform may be configured to register a computing device to a pool of computing devices that are available for use by portable hardware devices. As another example, the computing platform may, when a portable hardware device is inserted into the computing device, receive one or more indications that indicate one or more computing resources of the computing device have been used by the portable hardware device. These one or more indications, for example, may indicate that a processor of the computing device was used by the portable hardware device.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
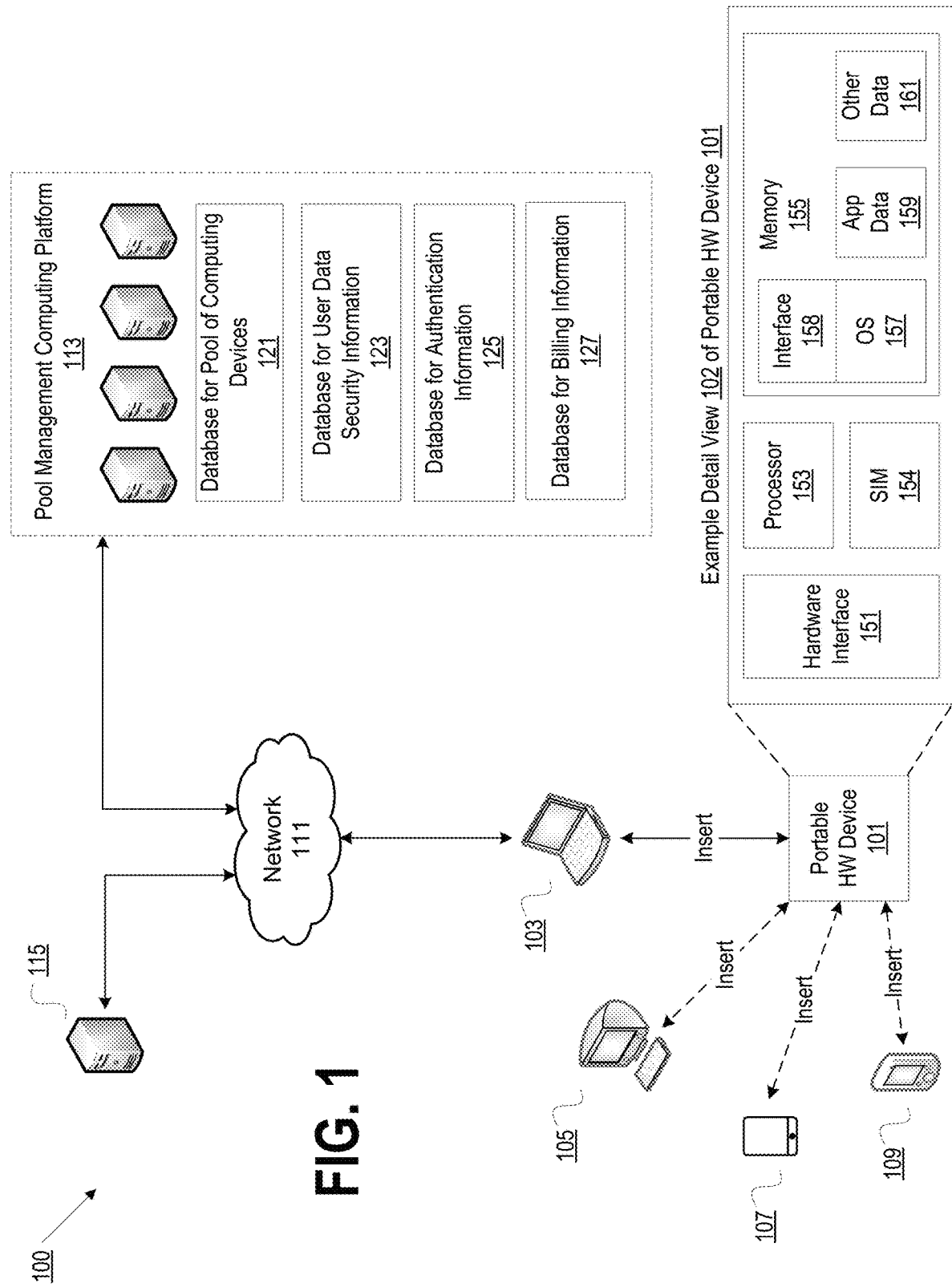
FIG. 1 depicts a block diagram of an example computing environment that may be configured to allow portable access to user data based on a portable hardware device.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for allowing access to user data across multiple devices. As a general introduction, a portable hardware device may include, among other things, an operating system and user data. The user data may include, among other things, an application. The portable hardware device may be configured to be inserted, or otherwise connected to, a first computing device (e.g., laptop computing device). Based on the operating system of the portable hardware device, one or more computing resources of the other computing device may be used, or controlled, in connection with accessing the user data. For example, the application may be executed using the one or more computing resources. More particularly, the application may be executed using a processor of the other computing device. Based on execution of the application, user interfaces of the application may be displayed on a display device of the other computing device. A user may interact with the user interfaces via one or more input/output devices of the other computing device (e.g., mouse, keyboard, touch display). In this way, the user is able to access the application based on the portable hardware device and the first computing device. The application could be similarly accessed by connecting the portable hardware device to a second computing device (e.g. a tablet device).

Accordingly, based on the portable hardware device and the first and second computing devices, a user may be able to access the user data across multiple devices. As one particular example, a user may, based on the portable hardware device and a laptop device at the user's home, access the user data while at home. The user may, based on the portable hardware device and the user's mobile device, access the user data during a commute to work. The user may, based on the portable hardware device and a desktop device at the user's office, access the user data while at the office. As the user data is stored on the portable hardware device, the user's experience may be maintained across those devices. Thus, the user's experience across those devices may be improved based on the portable hardware device.

The first and second computing devices mentioned above may be part of a pool of computing devices that are available for use by portable hardware devices. A computing platform may be configured to manage the pool of computing devices. For example, the computing platform may be configured to process registrations of new devices to the pool. Based on a registration, the computing platform may be configured to send software to the newly registered device. The software may be configured to interface with portable hardware devices. In this way, a portable hardware device, when connected to the newly registered device and based on execution of the software, may be able to use computing resources of the newly registered device in connection with accessing the user data. Additionally, the computing platform may manage the portable hardware device's access to the user data and usage of computer resources. For example, the computing platform may receive indications of the portable hardware device's usage of the computing resources. The computing platform may be configured to determine a price for use of the computing resources and an account associated with the portable hardware device may be charged based on the price. Additional examples and details of aspects relating to the portable hardware device, the computing devices to which the portable hardware device can be connected, and the computing platform, among others, will be discussed below in connection with FIGS. 1-5.

FIG. 1 depicts a block diagram of an example computing environment 100 that may be configured to allow portable access to user data based on a portable hardware device 101. The portable hardware device 101 (labeled as the portable HW device in FIG. 1) is shown in FIG. 1 with an example detail view 102, which includes an example arrangement of hardware components for the portable hardware device 101. As depicted in the example detail view 102, the portable hardware device 101 may include hardware components such as a hardware interface 151, one or more processors 153, a subscriber interface module (SIM) 154, and memory 155.

The hardware interface 151 may be a bus configured to transfer data to and from the portable hardware device 101. Examples of suitable bus technologies for the hardware interface 151 include a peripheral component interconnect (PCI) bus, such as PCI Express (PCIe); or a serial AT attachment (SATA) bus. In some variations, the portable hardware device 101 may also include a wireless interface (not shown in the example detail view 102) configured to transfer data to and from the portable hardware device 101. An example of a suitable wireless technology may be BLUETOOTH. For simplicity, the examples discussed throughout this disclosure will be based on the hardware interface 151. Similar examples could be performed based on a wireless interface that connects the portable hardware device to another computing device such as any of the computing devices 103-109.

The one or more processors 153 may be configured to, among other things, send data to the hardware interface 151, receive data from the hardware interface 151, store data to the memory 153, retrieve data from the memory 153, decrypt data, and/or encrypt data. The types of processes performed by the one or more processors 153 will be apparent based on the disclosure as a whole. The one or more processors may include one or more reduced instruction set computing (RISC) processors, such as one or more ARM processors.

The SIM 154 may be an integrated circuit that stores a serial number, an international mobile subscriber identity (IMSI) number, security information, network information, service information, and password information. The integrated circuit of the SIM 154, and the information stored within, may enable a connection to and use of a cellular network.

The memory 155 may be a solid-state memory that allows for data to be both read from and written to the memory 155. The memory 155 is depicted in FIG. 1 as storing various types of software and/or data including, for example, an operating system (OS) 157, an interface layer 158, application (app) data 159, and other data 161. The operating system 157 may, via a kernel, be configured to, among other things, manage the application data 159, the other data 161, control the one or more processors 153, and/or control other hardware components of the portable hardware device 101. The operating system 157 may include, or otherwise be based on, NixOS or LegoOS. The interface layer 158 may be configured to interface the operating system 157 with various hardware components, technologies, or arrangements (e.g., the hardware components of computing devices 103-109). The interface layer 158 may take the form of a particular applications programming interface (API). The interface layer 158 may be considered as a layer on top of the operating system 157 or as part of the operating system 157.

The application data 159 and the other data 161 may represent the user data that can be accessed based on the portable hardware device 101. The application data 159 may include one or more applications that can be executed based on connection of the portable hardware device 101 to the computing devices 103-109. The other data 161 may include identification information, authentication information, setting information, and other forms of data that may be used in connection with the portable hardware device 101. For example, the identification information and/or the authentication information may be used to identify and/or authenticate the portable hardware device 101 with the pool management computing platform 113. The setting information may be used to establish an expected look and feel of various applications as the applications are executed by the computing devices 103-109. The application data 159 and the other data 161 may be securely stored using one or more secure technologies. For example, the application data 159 and the other data 161 maybe stored in an encrypted form. Additionally or alternatively, the application data 159 may store each application in a secure container. An application stored in a secure container may be referred herein as a containerized application.

The portable hardware device 101 may be configured for portability. For example, portable hardware device 101 may be configured as a card or similar device. As some examples, the portable hardware device 101 may have a length, width, and height similar to a credit card or a secure digital (SD) card. The exact dimensions of the portable hardware device 101 may vary based on the hardware components within and/or based on a size of a docking or porting technology used to form a physical connection between the portable hardware device 101 and a computing device (e.g., devices 103-109).

The example computing environment 100 includes example computing devices 103-109 that represent different types of devices that may be configured to connect with the portable hardware device 101 (e.g., via the hardware interface 151 and/or a wireless interface). As depicted in FIG. 1, the example computing devices 103-109 include a laptop computer 103, a personal computer 105, a tablet computer 107, and a mobile phone 109. The portable hardware device 101 may be inserted into, or otherwise connected to, any of the computing devices 103-109 (e.g., inserted into a port, bay, or dock, that is configured to receive the portable hardware device 101). The example computing environment 100 depicts an example where the portable hardware device 101 is inserted into the laptop computer 103. The physical connection between the portable hardware device 101 and the laptop computer 103 may use the hardware interface 151 of the portable hardware device (e.g., the physical connection may be a PCIe bus or a SATA bus). For simplicity, the remaining portion of FIG. 1 is discussed in view of the depicted example of inserting the portable hardware device 101 into the laptop computer 103. The portable hardware device 101 may be inserted into any of the other computing devices 105-109 and similar processes may be performed as those discussed in connection with insertion into the laptop computer 103.

Based on inserting the portable hardware device 101 into the laptop computer 103 (or any other of the depicted device 109), the portable hardware device 101 may perform a handshake process to enable its access to computing resources of the laptop computer 103. This handshake process may include communication between the OS 157, the interface layer 158, and/or other components of the portable hardware device 101 with the laptop computer 103. Based on these communications, the portable hardware device 101 may be able to use or otherwise control the computing resources of the laptop computer 103. The computing resources may include, for example, any hardware resource or software resource installed on the laptop computer 103. Non-limiting examples of the computing resources of the laptop computer 103 include one or more processors, a display device, a keyboard, a touch screen device, a mouse device, one or more memory devices, and the like. The handshake process and the computing resources may depend on the type of computing device the portable hardware device 101 is connected to. For example, if the portable hardware device 101 is connected to the mobile phone 109, the handshake process may include communications with the SIM 154 to enable access to a cellular network via the mobile phone 109. Further, the computing resources may include hardware and software resources configured to send data to/from the cellular network.

Based on the portable hardware device 101 being able to use or control the computing resources of the laptop computer 103, the user data may be accessed. For example, an application (e.g., stored within the application data 159) may be executed using the one or more processors of the laptop computer 103. Execution of the application may include generating user interfaces or other displays via a display device of the laptop computer 103. A user may interact with the application via an input/output device of the laptop computer 103 (e.g., a mouse, keyboard, touch screen). The user interfaces or other displays may be generated based on the setting information of the other data 161. In this way, access of the user data may include communication of data between the portable hardware device 101.

As the portable hardware device 101 uses or otherwise controls the computing resources of the laptop computer 103 (e.g., to execute an application stored within the application data 159), various communications may be performed between the portable hardware device 101 and the laptop computer 103. For example, the one or more processors 153 may decrypt data (e.g., data stored within the application data 159 and/or the other data 161) and forward it to the one or more processors of the laptop computer 103. The decrypted data may include application code that is forwarded to the laptop computer 103 for execution by the one or more processors 153. As another example, the one or more processors 153 may receive data from the laptop computer 103, may encrypt the data, and may store the encrypted data within the memory 155. With respect to an example where an application is being executed, the communications between the portable hardware device 101 and the laptop computer 103 may be any communication needed to perform computing tasks associated with execution of the application.

Based on the communications between the portable hardware device 101 and the laptop computer 103 and/or the use of the computing resources of the laptop computer 103, data may be sent, via one or more networks, to one or more destination devices. As depicted in the example computing environment 100, the laptop computer 103 may send data, via the network 111, to server 115 and/or pool management computing platform 113. The network 111 may represent one or more local and/or wide-area networks. For example, the network 111 may include Internet Protocol (IP) networks, telephone networks, cellular telephone networks, fiber optic networks, local wireless networks (e.g., WiMAX), satellite networks, and any other desired network. While not explicitly depicted in FIG. 1, any of the other computing devices 105-109 may communicate via the network 111.

The server 115 represents an example destination device that may be communicated with based on the use or control of the computing resources of the laptop computer 103 by the portable hardware device 101. For example, if a browser application is being executed based on the use or control of the computing resources of the laptop computer 103, the server 115 may be a web server that receives and responds to Hypertext Transfer Protocol (HTTP) requests, or otherwise sends data for displaying a web page via the browser application. As another example, the server 115 may be a cloud-based computing service that allows access to data or other resources stored or managed by the cloud-based computing service. In this way, an application that accesses the cloud-based computing service may be executed based on the use or control of the computing resources of the laptop computer 103, and a user may be able to interact with the cloud-based computing service based on execution of the application.

The pool management computing platform 113 may be configured to manage a pool of computing devices that can interface with portable hardware devices and may be configured to manage access to the user data stored by the portable hardware devices. For example, computing devices 103-109 may be part of the pool of computing devices managed by the pool management computing platform 113. Each of the devices may have been registered by the pool management computing platform 113. Based on insertion of the portable hardware device 101 into one of the computing devices 103-109, the pool management computing platform 113 may store an indication of which computing device is being used by the portable hardware device 101. Based on use or control of computing resources by the portable hardware device 101, pool management computing platform 113 may collect information indicative of the computing resource use. Based on the computing resource use, an account associated with the portable hardware device 101 may be billed.

As one example, based on insertion of the portable hardware device 101 into the laptop computer 103, the pool management computing platform 113 may store an indication that the laptop computer 103 is in use. As the portable hardware device 101 uses or otherwise controls the computing resources of the laptop computer 103 (e.g., to execute an application stored within the application data 159), the pool management computing platform 113 may collect information indicating that one or more computing resources of the laptop computer 103 were used. This information may indicate, for example, the type of resource used (e.g., a processor of the laptop computer 103 was used), the time of use (e.g., the processor of the laptop computer 103 was used for 2 hours), or information specific to the resource used (e.g., a number of processor cycles used if a processor is used; an amount of memory used if a memory of the laptop computer 103 is used), and the like. Based on this information, the pool management computing platform 113 may determine an amount to bill to an account associated with the portable hardware device 101. The amount may be based on a price, set by an owner of the laptop computer 103, for use of the computing resources or laptop computer 103.

As depicted in FIG. 1, the pool management computing platform 113 may include or otherwise have access to various databases. These databases may be accessed in connection with managing the pool of computing resources (e.g., a pool that includes devices 103-109) and/or managing access to the user data stored by the portable hardware device 101. As depicted in FIG. 1, the pool management computing platform 113 includes or otherwise has access to a database for the pool of computing devices 121, a database for user data security information 123, a database for authentication information 125, and a database for billing information 127. These databases 121-127 provide one example arrangement of databases that may be accessed by the pool management computing platform 113 in connection with managing the pool of computing resources and/or managing access to the user data stored by the portable hardware device 101. Additional databases or alternative databases may be accessed in connection with managing the pool of computing resources and/or managing access to the user data stored by the portable hardware device 101.

The database for the pool of computing devices 121 may include information indicative of devices that are part of the pool, information indicative of which devices are currently in use, and/or information that associates each device of the pool to an account of an owner of the device. For example, the database for the pool of computing devices 121 may include information that indicates the computing devices 103-109 are part of the pool. Based on the portable hardware device 101 being connected to the laptop computer 103, the database for the pool of computing devices 121 may include information indicating that the laptop computer 103 is in use. The database for the pool of computing devices 121 may include information that associates the laptop computer 103 to an account associated with the owner of the laptop computer 103.

The database for user data security information 123 may include information for securing the user data stored by portable hardware devices. For example, for the portable hardware device 101, the database for user data security information 123 may include one or more encryption or decryption keys, and/or other data security information (e.g., information for accessing a secure container of the application data 159), that are used in connection with accessing the user data stored by the portable hardware device 101. The pool management computing platform 113 may send the one or more encryption and decryption keys, and/or the other data security information, to the portable hardware device 101. In this way, the portable hardware device 101 may be able to encrypt, decrypt, and otherwise access (e.g., access a secure container of the application data 159) the user data.

The database for authentication information 125 may include information for authenticating the portable hardware devices. For example, for the portable hardware device 101, the database for authentication information 125 may include a copy of the identification information of the portable hardware device 101 and a copy of the authorization information of the portable hardware device 101. Based on these copies, the pool management computing platform 113 may verify identity and/or authorize the portable hardware device 101.

The database for billing information 127 may include information for billing accounts based on computing resource usage of portable hardware devices. For example, the database for billing information 127 may include account information associated with portable hardware devices, account information associated with devices of the pool of computing devices, account information associated with users of the portable hardware devices, and/or account information associated with owners of devices of the pool of computing devices. The database for billing information 127 may include pricing information that indicates one or more prices for use of computing resources and/or devices of the pool of computing devices. As one particular example with respect to the portable hardware device 101 and the laptop 103, the database for billing information 127 may include account information associated with the portable hardware device 101, account information associated with the laptop computer 103, and pricing information for use of computing resources of the laptop computer 103. Based on this account and pricing information, the pool management computing platform 113 may bill the account associated with the portable hardware device 101 based on use of the laptop computer 103 by the portable hardware device 101.

The pool management computing platform 113 is depicted in FIG. 1 as including one or more platform computing devices (e.g., the four computing devices depicted as part of the pool management computing platform 113 may). These one or more platform computing devices may be configured to perform the functions of the pool management computing platform 113 discussed throughout this disclosure.

Figure 2:
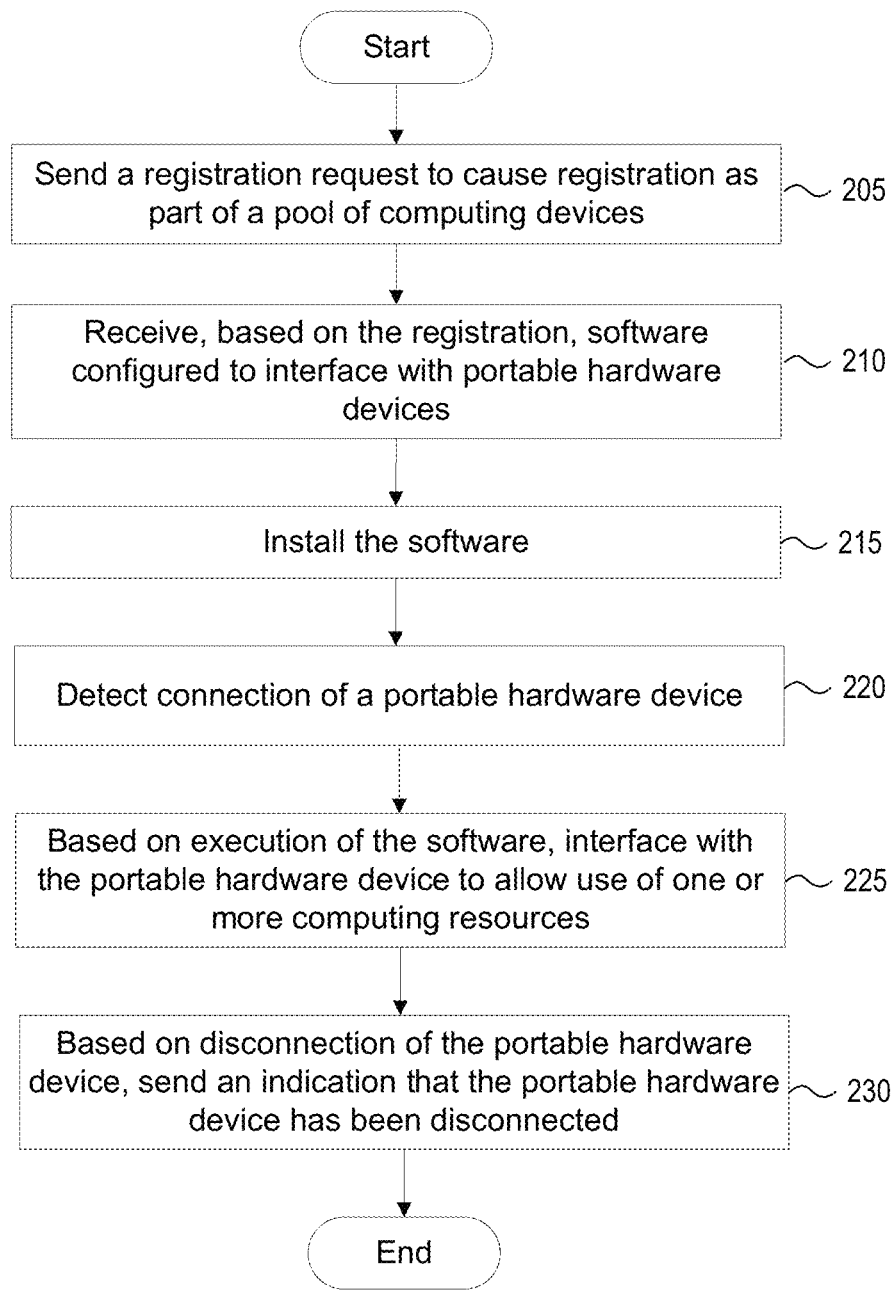
FIG. 2 depicts an example method that may be performed by a computing device that is to interface with a portable hardware device to enable access to user data.
Figure 3:
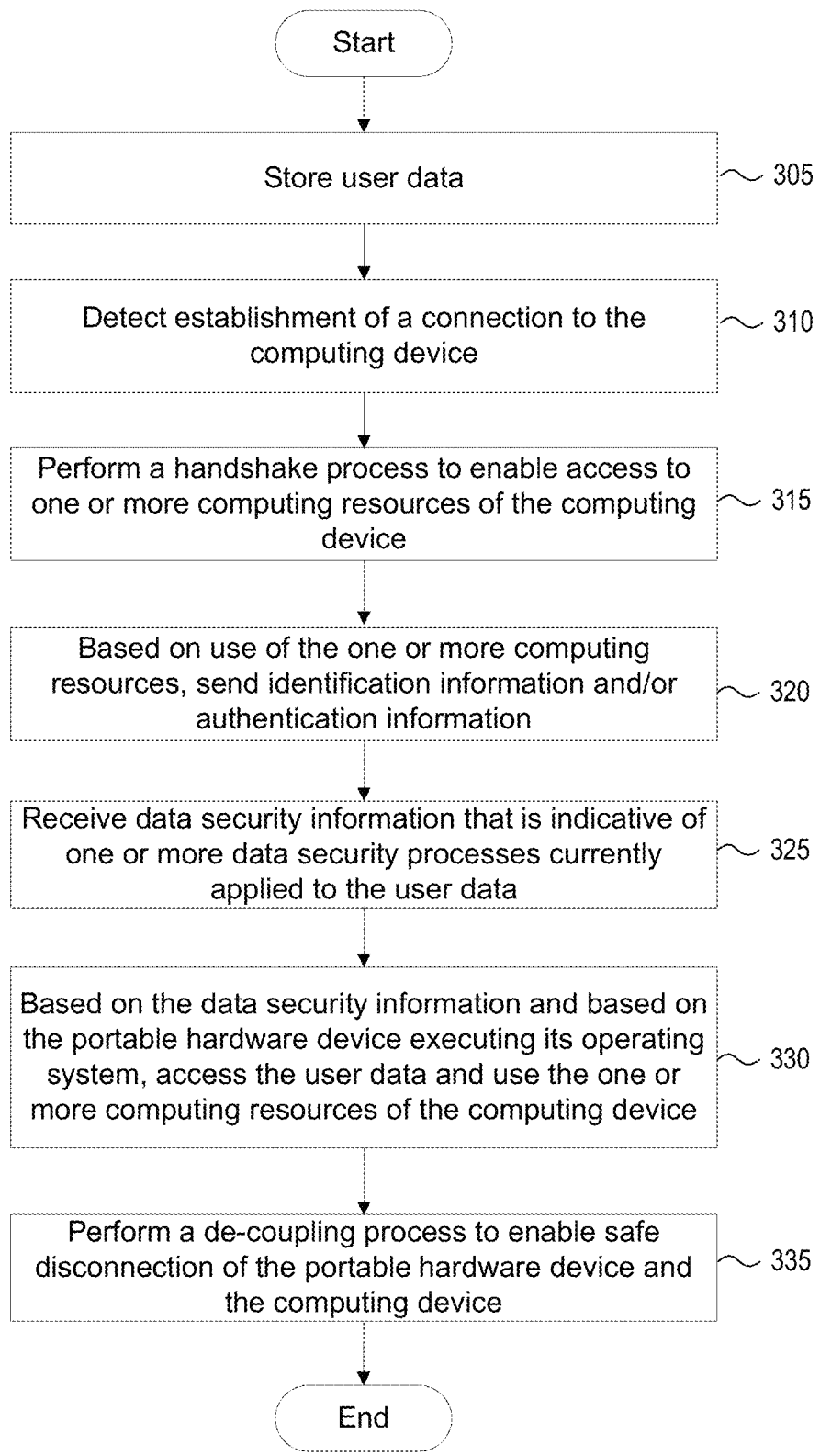
FIG. 3 depicts an example method that may be performed by the portable hardware device in connection with allowing portable access to user data.
Figure 4:
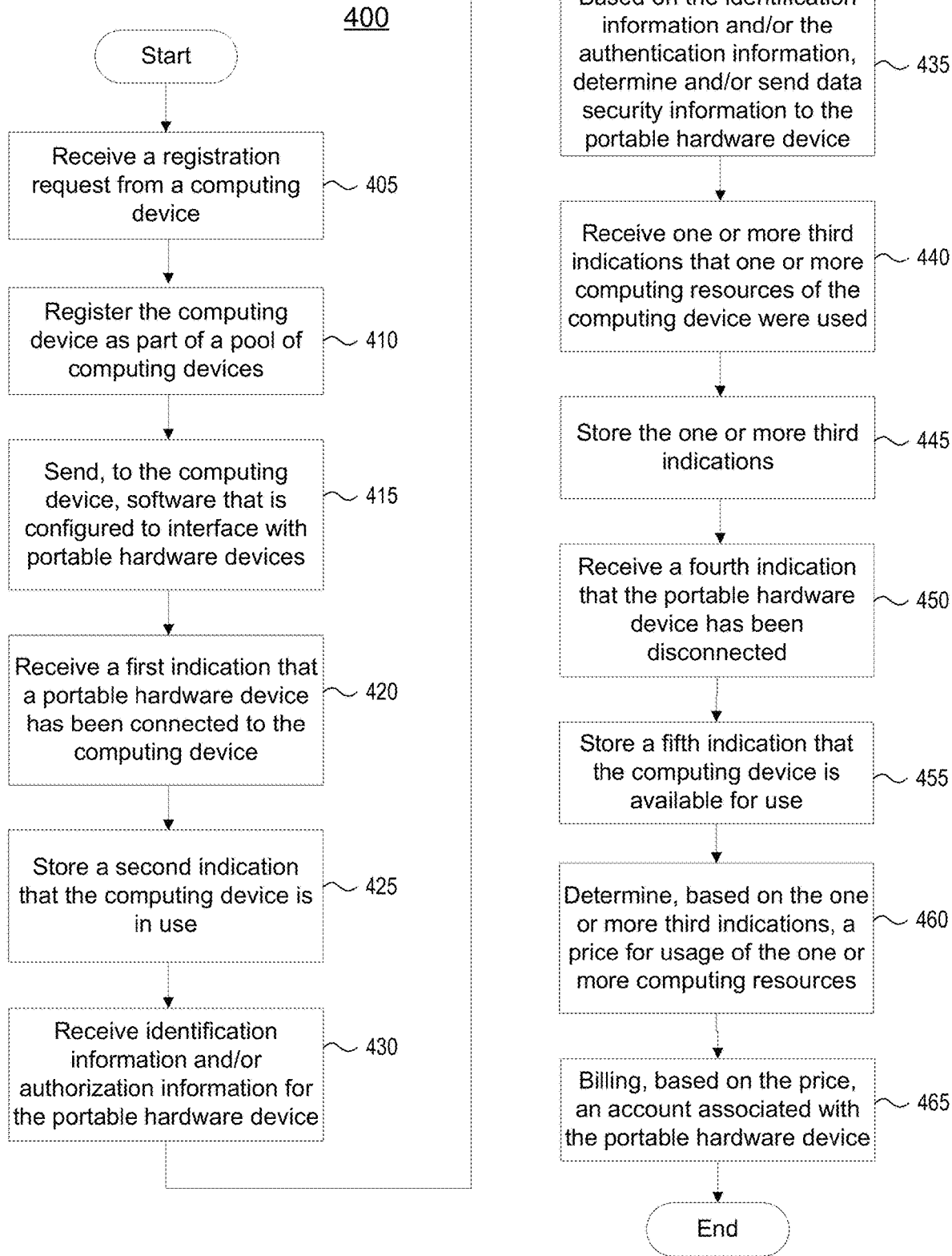
FIG. 4 depicts an example method that may be performed by a computing platform that, among other things, manages the portable hardware device's access to the user data and monitors usage of computer resources by the portable hardware device.

Having discussed the example computing environment 100 of FIG. 1, example methods, which may be performed by various devices of the example computing environment 100, will be discussed. The example methods are depicted at FIGS. 2-4. In particular and among other things, the example methods of FIGS. 2-4 provide additional details on aspects described in connection with the portable hardware device 101, the pool management computing platform 113, and the computing devices 103-109. Further, various details of certain aspects will be discussed throughout the example methods of FIGS. 2-4. As one example, step 205 of FIG. 2 discusses the sending of a registration request. Some details on the processes performed based on receipt of the registration request is discussed in the example method 400 of FIG. 4.

FIG. 2 depicts an example method 200 that may be performed by a computing device that is to interface with a portable hardware device. Method 200 may be performed by any computing device that is able to register as part of the pool of computing devices, as described herein. For example, method 200 may be performed by any of the computing devices 103-109 of FIG. 1. Method 300 may be implemented in suitable computer-executable instructions.

At step 205, a computing device may send a registration request to cause registration as part of a pool of computing devices that are available for use by portable hardware devices. The registration request may be sent to a pool management computing platform (e.g., pool management computing platform 113 of FIG. 1). The request may indicate an identifier of the computing device (e.g., a media access control (MAC) address of the computing device), an account associated with an owner of the computing device, and/or pricing information associated with use of the computing device. In other words, the registration request may include any information necessary for a pool management computing platform to register the computing device as part of the pool of computing devices and to bill for use of the computing device by portable hardware devices. An owner, or other user, of the computing device may input the information of the registration request and may cause the registration request to be sent by the computing device.

At step 210, the computing device may receive, based on the registration of the computing device as part of the pool of computing devices, software that is configured to interface with portable hardware devices. The software may include code that is configured to, when executed, cause the computing device to communicate with a portable hardware device; be used by a portable hardware device; be controlled by a portable hardware device; and/or communicate with the pool management computing platform based on insertion of, use by, and/or control by a portable hardware device. The set of drivers may include code that enables secure (e.g., encrypted) communication between the computing device and a portable hardware device. The set of drivers may include code that enables a portable hardware device to manage hardware, or other computing resources, of the computing device. The software may be, or otherwise include, a set of drivers for installation on the computing device.

At step 215, the computing device may install the software. Based on installation of the software, the computing device may be able to execute the software and interface with a portable hardware device. The software may be assumed to be executing by the computing device for the remaining steps of the example method 200 of FIG. 2.

At step 220, the computing device may detect a connection of a portable hardware device with the computing device. The connection may be based on insertion of the portable hardware device into the computing device. For example, the portable hardware device may be inserted into a port, bay, or dock of the computing device. The port, bay, or dock may be configured to receive the portable hardware device. Upon insertion, a bus between the computing device and the portable hardware device may be established (e.g., a PCIe bus or a SATA bus). The insertion may be detected based on the establishment of the bus.

At step 225, the computing device may, based on execution of the software, interface with the portable hardware device. The interfacing may include various processes and/or communications with the portable hardware device. For example, as part of the interfacing, a handshake process may be performed with the portable hardware device. Based on the handshake process, the computing device may send indications of one or more computing resources of the computing device (e.g., indications of some or all hardware components of the computing device and/or some or all software components of the computing device). Based on the handshake process, the computing device may request additional software for installation on the computing device (e.g., one or more drivers associated with the one or more computing resources). This additional software may be configured to enable the portable hardware device's use of the one or more computing devices (e.g., a driver configured to enable the portable hardware device's use of a hardware component of the computing device). The additional software may be requested and received from the pool management computing platform and/or another source (e.g., a server provided by a manufacturer of a computing resource). Based on the handshake process, the portable hardware device may be able to use or otherwise control any of the one or more computing resources. As another example, as part of the interfacing, any or all of the one or more computing resources may be used or controlled by the portable hardware device (e.g., an application stored on the portable hardware device may be executed by a processor of the computing device). As yet another example, as part of the interfacing, a de-coupling process may be performed to enable safe disconnection of the portable hardware device from the computing device. Based on the de-coupling process, the ability for the portable hardware device to use or control the one or more computing resources may be disabled. Additionally, as part of the interfacing, the computing device may send data to and/or receive data from the portable hardware device, and the computing device may send data to and/or receive data from one or more other destination devices (e.g., server 115 of FIG. 1) or the pool management computing platform (e.g., pool management computing platform 113 of FIG. 1). For example, as part of the interfacing, the computing device may send indications of the use of the one or more computing resources to the pool management computing platform.

As part of the interfacing, the computing device may generate one or more displays that indicate a status of the interfacing. For example, the computing device may generate one or more displays indicating a status of the handshake process. As another example, the computing device may generate one or more displays indicating information associated with the use and control of the one or more computing resources (e.g., which computing resources are being and/or have been used and controlled; statistics indicative of the use and control; and the like). As yet another example, the computing device may generate one or more displays indicating one or more connections established based on the use and control (e.g., display screen with indications of a connection with the portable hardware device, a connection with the pool management computing platform, and one or more connections with one or more servers, such as server 115 of FIG. 1). A user may be able to minimize, or otherwise hide, these displays (e.g., the user may hide a display indicating which computing resources are being and/or have been used and controlled so that a display of a browser application is viewable).

At step 230, the computing device may, based on disconnection of the portable hardware device, send an indication that the portable hardware device has been disconnected. This indication may be sent to the pool management computing platform.

The above steps of example method 200 provide a general overview of the processes performed by a computing device that is to interface with a portable hardware device. Additional details of these steps and processes are provided in connection with FIGS. 3 and 4.

FIG. 3 depicts an example method 300 that may be performed by a portable hardware device. For example, method 300 may be performed by the portable hardware device 101 of FIG. 1. Method 300 may be implemented in suitable computer-executable instructions.

At step 305, the portable hardware device may store user data. The user data may include, for example, application data (e.g., app data 159 of FIG. 1) that includes one or more applications that are to be executed based on connection of the portable hardware device to another computing device. Additionally or alternatively, the user data may include other forms of user data (e.g., other data 161) that are to be accessed based on connection of the portable hardware device to another computing device. For example, the other forms of user data may include identification information and/or authentication information, which are usable to verify identity of the portable hardware device and/or to authorize access to the remaining portions of the user data. The portable hardware device may encrypt some or all of the user data and may store the encrypted user data in its memory. The identification information and/or authentication information may be stored separately from other portions of the user data (e.g., in a location specifically reserved for the identification information and/or authentication information). The SIM 154 may store, or otherwise include, some of the identification information and/or authentication information (e.g., a serial number, an IMSI, security information, network information, service information, and password information). Additionally or alternatively, the portable hardware device may store the user data, or portions thereof, in one or more secure containers. For example, each application may be stored in its own secure container, which results in the portable hardware device storing one or more containerized application(s).

The storage of the user data performed at step 305 may be part of an initialization process for the portable hardware device. For example, step 305 may be performed if the portable hardware device is inserted into, or otherwise connected to, a computing device and does not store any user data. As another example, step 305 may be performed if the portable hardware device is inserted into, or otherwise connected to, a computing device and is set to a factory default state (e.g., memory 155 is wiped of user data).

At step 310, the portable hardware device may detect establishment of a connection to the computing device. The connection may be based on insertion of the portable hardware device into the computing device. For example, the portable hardware device may be inserted into a port, bay, or dock of a computing device (e.g., any of devices 103-109 of FIG. 1). Upon insertion, a bus between the portable hardware device and the computing device may be established (e.g., a PCIe bus or a SATA bus). The connection may be detected based on the establishment of the bus.

At step 315, the portable hardware device may perform a handshake process to enable access to one or more computing resources of the computing device. The handshake process may be performed based on communications with the computing device over the bus between the portable hardware device and the computing device. Based on the handshake process, the portable hardware device may receive, from the computing device, indications of the one or more computing resources (e.g., indications of some or all hardware components of the computing device and/or some or all software components of the computing device). Based on the handshake process, the portable hardware device may be able to use or otherwise control any of the one or more computing resources. Further, based on the handshake process, one or more displays may be generated by the computing device that indicates a status of the handshake process (e.g., a first display indicating the handshaking process is ongoing, a second display indicating completion of the handshaking process, and a fourth display indicating user data accessible via the portable hardware device).

At step 320, the portable hardware device may, based on use or control of the one or more computing resources, send identification information and/or authentication information. The identification information and/or authentication information may be sent to the pool management computing platform. For example, the portable hardware device may retrieve the identification information and/or the authentication information from the location specifically reserved for the identification information and/or the authentication information The portable hardware device may forward the identification information and/or the authentication information via the bus to the computing device. Further, the identification information and/or authorization information may include one or more identifiers associated with the portable hardware device (e.g., information stored by SIM 154 such as a serial number, an IMSI, security information, network information, service information, and password information). Upon receipt, the computing device may use some or all of the one or more computing resources to cause the identification information and/or the authentication information to be sent to the pool management platform.

At step 325, the portable hardware device may receive data security information that is indicative of one or more data security processes that are currently applied to the user data. For example, the data security information may include a decryption key for decrypting any portion of the user data that is stored in an encrypted form. The data security information may include an encryption key for encrypting data that is to be stored in the memory of the portable hardware device based on use or control of the one or more computing resources. The data security information may include additional information including, for example, information needed to access a secure container of the portable hardware device.

The data security information may be received from the pool management computing platform. The data security information may be sent by the pool management computing platform as a response to the identification information and/or the authentication information that was sent at step 320. For example, the computing device may initially receive the data security information from the pool management computing platform. The computing device may forward the data security information to the portable hardware device via the bus between the computing device and the portable hardware device. In this way, the portable hardware device may receive the data security information.

At step 330, the portable hardware device may, based on the data security information and based on the portable hardware device executing its operating system, access the user data and use, or control, the one or more computing resources of the computing devices. To access a portion of the user data, the portable hardware device may retrieve the portion from its memory (e.g., memory 155) and may decrypt the portion using a decryption key included as part of the data security information. The portable hardware device may forward the portion, after it has been decrypted, to the computing device. Upon receipt of the portion, the computing device may process the data, which will depend on the type of data that was forwarded. As some examples, code may be executed by the processor of the computing device. Graphical data may be displayed on a display device of the computing device. Packet data for transmission may be sent using a network interface device of the computing device to an intended destination (e.g., server 115 via network 111). In this way, the portable hardware device, based on execution of its operating system, may use or control the one or more computing resources of the computing device.

Additionally, in connection with the use and control of the one or more computing resources of the computing device, the portable hardware device may receive data from the computing device via the bus. This data may be intended for storage as part of the user data. Upon receipt of this data, the portable hardware device may encrypt the data based on an encryption key included as part of the data security information. The portable hardware device may, after encrypting the data, store the data to its memory. The location in its memory may depend on the type of data being stored. For example, if the data is associated with installation of a new application to the portable hardware device, the data may be stored in a secure container for the newly installed application (e.g., store the data in a secure container of app data 159).

In general, access to the user data and/or use of the one or more computing resources may be based on a user's interaction with the computing device while the portable hardware device is inserted into the computing device. For example, if the portable hardware device is inserted into a laptop computer, a user of the laptop computer may be able to browse the applications stored as part of the user data on the portable hardware device, select an application for execution by the laptop computer, and interact with the application via the laptop computer. All the while, the portable hardware device, via its operating system, may be using and controlling the one or more computing resources of the laptop computer to perform processes based on these user interactions. As another example, if the portable hardware device is inserted into a mobile phone, a user of the mobile phone may be able to browse contact information stored as part of the user data on the portable hardware device, select a contact to call using the mobile phone, and conduct a call with the contact using mobile phone. All the while, the portable hardware device, via its operating system, may be using and controlling the one or more computing resources of the mobile phone to perform processes based on these user interactions. Additionally, for any device that is connected to a cellular network, the connection to the cellular network may be based on the SIM of the portable hardware device.

Table I illustrates examples of user data stored by a portable hardware device, user interactions associated with the examples of user data, and computing resources that are used and/or controlled based on the user data and the user interactions. In this way, Table I provides additional examples of the portable hardware device's access to the user data and/or use of the one or more computing resources. The first column of Table I provides example types of user data (e.g., a browser application, contact list information, a word processing application). The second column of Table I provides example user interactions that may cause access to the corresponding type of the user data (e.g., a browser application may be accessed based on a user selecting to execute the browser application). Each example user interaction may be performed using an input/output device of the computing device (e.g., a keyboard, mouse, touch screen, keypad, or the like). The third column provides examples of computing resources that are used or controlled by the portable hardware device based on the corresponding user interactions (e.g., based on selecting a browser application, memory of the computing device may store portions of the browser application's code, a processor of the computing device may execute the browser application's code, and a display device of the computing device may display user interfaces and other displays for the browser application). The example computing resources are not meant to be exclusive and other computing resources may be used in addition to those listed for any type of example user data and/or any example user interaction (e.g., for a browser application, an input/output device of the computing device may be used to interact with a website currently being displayed on the display device of the computing device). The examples provided in Table I are non-limiting and provided as a way to further illustrate the many ways in which a user's interaction with the computing device could result in access to the user data and use of the computing device's computing resources while the portable hardware device is inserted into the computing device. Other examples are provided throughout this disclosure and are apparent based on the disclosure as a whole.

TABLE I

| Example user data | Example User Interactions | Example Computing Resources |
|---|---|---|
| An application | Selection of an application to install on the portable hardware device | Memory of the computing device may store a copy of the application. A processor of the computing device may forward the copy of the application to the portable hardware device, which may cause the portable hardware device to install the application within its memory (e.g., within a secure container of the application data 159). A display device of the computing device may display indications of the status of the installation and/or user interfaces that guide the user through the installation process. |
| Browser application | Selection of the browser application | Memory of the computing device may store portions of the browser application's code. A processor of the computing device may execute the browser application's code. A display device of the computing device may display user interfaces and other displays for the browser application. |
| Browser application | Selection of a website | A network interface device of the computing device may send a request for the website. The network interface device of the computing device may receive data for the website. Memory of the computing device may store the data for the website. A display device of the computing device may, based on the data for the website, display the website. |
| Contact list information | Selection of a contact's phone number to call | Cellular telephony hardware of the computing device may be used to initiate and conduct the call. A display device of the computing device may display indications of the status of call. |
| Document associated with a word processing application | Selection of the document to open using the word processing application | Memory of the computing device may store portions of the word processor application's code and may store a copy of the document's data. A processor of the computing device may execute the word processor application's code. A display device of the computing device may display user interfaces and other displays for the word processor application that provides views of the document. An input/output device of the computing device may be used to edit the document. |
| Document associated with a word processing application | Selection to save the document | Memory of the computing device may store an updated copy of the document's data. A processor of the computing device may forward the updated copy of the document to the portable hardware device, which may cause the portable hardware device to overwrite the previous copy of the document. |
| Video associated with a video editing or processing | Selection to render, convert, or otherwise | Memory of the computing device may store video data of the video. A processor of the computing device |

TABLE I-continued

Examples of user data, user interactions, and computing resources

| Example user data | Example User Interactions | Example Computing Resources |
| --- | --- | --- |
| application | modify the video | may send video data to a graphical processing unit (GPU) of the computing device. The GPU may process the video data to perform the selected rendering, converting, or modifying. A display device of the computing device may, based on the processing performed by the GPU, display the video data. |
| Video associated with a video editing or processing application | Selection to save the video | Memory of the computing device may store an updated copy of the video (e.g., after rendering, converting, or modifying by a GPU of the computing device). A processor of the computing device may forward the updated copy of the video to the portable hardware device, which may cause the portable hardware device to store the updated copy of the video. |
| Setting information | Selection of an application to execute | Memory of the computing device may store a copy, or a portion thereof, of the setting information. A processor of the computing device may process the setting information to determine various characteristics (e.g., key bindings, default window size, display theme) for the application based on the setting information. The processor of the computing device may execute the application based on the characteristics (e.g., enable the key bindings). A display device of the computing device may display user interfaces and other displays based on the characteristics (e.g., display the application based on the default window size and/or the display theme). |
| Setting information | Input that changes the setting information | Memory of the computing device may store an updated copy, or a portion thereof, of the setting information. A processor of the computing device may forward the updated copy, or portion thereof, of the setting information to the portable hardware device, which may cause the portable hardware device to overwrite the previous copy of the setting information. |

At step 335, the portable hardware device may perform a de-coupling process to enable safe disconnection of the portable hardware device and the computing device. For example, if the portable hardware device is inserted into the computing device, the de-coupling process may be performed to enable safe removal of the portable hardware device from the computing device. Based on the de-coupling process, the ability for the portable hardware device to use or control the one or more computing resources may be disabled. Further, as part of the de-coupling process, the portable hardware device may delete the data security information, or a portion thereof, from its memory. For example, the portable hardware device may delete any encryption and/or decryption keys received as part of the data security information. In this way, the portable hardware device, after deletion of the encryption and/or decryption keys, may be unable to encrypt or decrypt any of the stored user data until new encryption and/or decryption keys are received from the pool management computing platform. Additionally, after performing the de-coupling process, the portable hardware device may be safely disconnected (e.g., removed) from the computing device.

FIG. 4 depicts an example method 400 that may be performed by a pool management computing platform. Method 400 may be performed by any of the one or more computing devices of the pool management computing platform (e.g., one or more of the four platform computing devices depicted as part of the pool management computing platform 113). For simplicity, method 400 is discussed as being performed by a platform computing device (e.g., one of the four platform computing devices depicted as part of the pool management computing platform 113). Additionally, method 400 includes an example where some communications with the platform computing device are performed based on blockchain technology. Blockchain technology is only one example of the types of technologies that could be used to communicate with the platform computing device. Method 400 may be implemented in suitable computer-executable instructions.

At step 405, the platform computing device may receive a registration request from a computing device. This registration request may have been sent by the computing device (any one of computing devices 103-109 of FIG. 1) to cause registration as part of the pool of computing devices that are available for use by portable hardware devices (e.g., sent at step 205 of FIG. 2). The request may indicate an identifier of the computing device (e.g., a media access control (MAC) address of the computing device), an account associated with an owner of the computing device, and/or pricing information associated with use of the computing device.

At step 410, the platform computing device may register the computing device as part of the pool of computing devices available for use by portable hardware devices. Registering the computing device may include storing the identifier of the computing device in association with the pool of computing devices (e.g., store the identifier in the database for the pool of computing devices 121). Registering the computing device may include storing one or more indications of the account associated with the owner of the computing device (e.g., store an indication that the computing device is associated with the account in the database for the pool of computing devices 121; store an indication of the account in the database for the billing information 127). Registering the computing device may include storing one or more indications of the pricing information (e.g., store the pricing information in the database for the billing information 127; store an indication that the pricing information is associated with the account in the database for the billing information 127). As part of registering the computing device, various database records may be initialized (e.g., in each of databases 121-127 of FIG. 1). For example, a data record for the computing device may be initialized that includes, for example, data fields for the identifier of the computing device and an indication of whether the computing device is currently in use by a portable hardware device. As part of registering the computing device, a blockchain may be initialized and associated with the computing device. For example, a blockchain may be initialized that will be used for some or all communications between the computing and the pool management computing platform. Initializing the blockchain associated with the computing device may include generating an initial block for the blockchain. The initial block may include an initial hash value, a timestamp indicating the time of registration for the computing device, and an indication that the initial block is for the registration of the computing device.

At step 415, the platform computing device may send, to the computing device, software that is configured to interface with portable hardware devices. The software may be sent as part of a response to the registration request. The software may include code that is configured to, when executed, cause the computing device to communicate with a portable hardware device; be used by a portable hardware device; be controlled by a portable hardware device; and/or communicate with the pool management computing platform based on insertion of, use by, and/or control by a portable hardware device. The software may be configured to communicate with the pool management computing platform, for certain types of communications, based on the blockchain that was initialized based on the registration of the computing device.

Additionally, the platform computing device may send additional data as part of the response to the registration request. For example, in some variations, the platform computing device may send the initial block of the blockchain. In this way, the computing device may, based on execution of the software, be able to generate additional blocks to the blockchain when communicating with the pool management computing platform. In some variations, the software sent at step 415 may be configured with the initial block.

At step 420, the platform computing device may receive a first indication that a portable hardware device has been connected to the computing device. The computing device may have sent this indication based on detecting that the portable hardware device is inserted (e.g., step 220 of FIG. 2) and/or based on completion of the handshake process with the portable hardware device (e.g., step 315 of FIG. 3). This first indication may be received within a block of the blockchain associated with the computing device.

At step 425, the platform computing device may store a second indication that the computing device is in use. Storing the second indication may include updating, or otherwise setting, a data field in a data record to indicate the computing device is in use (e.g., updating or otherwise setting a data field in a data record stored by the database for the pool of computing devices 121).

At step 430, the platform computing device may receive identification information and/or authorization information for the portable hardware device. The identification information and/or authorization information may have originated from the portable hardware device and been sent to the pool management computing platform via the computing device (e.g., step 320 of FIG. 3). Further, the identification information and/or authorization information for the portable hardware device may include one or more identifiers associated with the portable hardware device (e.g., information stored by SIM 154 such as a serial number, an IMSI, security information, network information, service information, and password information). The identification information and/or authorization information may be usable to verify identity of the portable hardware device and/or to determine an account associated with the portable hardware device. Further, the identification information and/or authorization information may be stored, or otherwise indicated, in a log for the portable hardware device (e.g., a log stored in database for authentication information 125). This identification and/or authorization information may be received within a block of the blockchain associated with the computing device.

At step 435, the platform computing device may, based on the identification information and/or authentication information, determine and/or send data security information to the portable hardware device. The data security information may indicate one or more data security processes currently applied to the user data. For example, the data security information may include one or more encryption keys for encrypting data stored to the portable hardware device, one or more decryption keys for decrypting data stored to the portable hardware device, and information for accessing secure containers on the portable hardware device.

For example, the platform computing device may verify that the identification information and/or may authenticate the portable hardware device based on the authentication information. The verification of the identification information may including verifying that an identifier for the portable hardware device, included as part of the identification information, is found within a set of existing portable hardware devices. Authentication may include, for example, determining that any received token, certificate, or digital signature, included as part of the authentication information, matches expected values or is otherwise determined to be valid. Verifying and/or authenticating may include searching, analyzing, generating, storing, and/or updating one or more data records associated with verification and/or authentication of the portable hardware device (e.g., search, analyze, generate, store and/or update one or more data records stored by database for authentication information 125).

Once verification and/or authentication is complete, the platform computing device may determine the data security information for the portable hardware device. This may include determining the one or more encryption keys, the one or more decryption keys, and the information for accessing secure containers on the portable hardware device. The encryption and/or decryption keys may be determined based on a key rotation algorithm. The encryption and/or decryption keys may be determined based on a data record that indicates one or more encryption and/or decryption keys that were previously sent to the portable hardware device. The encryption and/or decryption keys may of various lengths (e.g., 128, 192, or 256 bits) dependent on the type of cryptography technology used to determine the keys. For example, Advanced Encryption Standard 256 (AES 256) may be used to determine keys with lengths of 256 bits. The information for accessing the secure containers on the portable hardware device may include a password. Determining the data security information may include generating, storing, and/or updating one or more data records to indicate the data security information (e.g., generate, store, and/or update one or more data records stored by database for user data security information 123).

Once the data security information is determined, platform computing device may send the data security information to the portable hardware device. The sending may include first sending the data security information to the computing device. Upon receipt, the computing device may forward the data security information to the portable hardware device (e.g., step 325 of FIG. 3). The data security information may be sent within a block of the blockchain associated with the computing device.

At step 440, the platform computing device may receive one or more third indications that one or more computing resources of the computing device were used. These one or more third indications may be sent by the computing device based on the portable hardware device's access of the user data and/or use or control of the one or more resources (e.g. step 330 of FIG. 3). Each of the one or more third indications may include information that indicates, for example, the type of resource used (e.g., a processor of the computing device was used), the time of use (e.g., the processor of the computing device was used for 2 hours), or information specific to the resource used (e.g., a number of processor cycles used if a processor is used; an amount of memory used if a memory of the computing device is used), and the like. The one or more third indications may take the form of, or otherwise be included, within one or more blocks of the blockchain associated with the computing device.

At step 445, the platform computing device may store the one or more third indications. The one or more third indications may be stored for later processing including, for example, when billing for use of the computing device. The one or more third indications may be stored, for example, in one or more data records associated with the computing device (e.g., in one or more data records stored by the database for the pool of computing devices 121).

At step 450, the platform computing device may receive a fourth indication that the portable hardware device has been disconnected from the computing device. The computing device may have sent the fourth indication based on disconnection (e.g., removal) of the portable hardware device (e.g., step 230 of FIG. 2). This fourth indication may be received within a block of the blockchain associated with the computing device.

At step 455, the platform computing device may store a fifth indication that the computing device is available for use. Storing the fifth indication may include updating, or otherwise setting, a data field in a data record to indicate the computing device is in use (e.g., updating or otherwise setting a data field in a data record stored by the database for the pool of computing devices 121).

At step 460, the platform computing device may determine, based on the one or more third indications, a price for usage of the one or more computing resources. The price may be determined based on one or more usage statistics and pricing information associated with the computing device. For example, as part of determining the price, the platform computing device may determine one or more usage statistics based on the one or more third indications. The one or more usage statistics may indicate one or more volumes of time the computing device and/or the one or more computing resources were used (e.g., a statistic indicating that the computing device was used for 2 hours and a statistic indicating that the network interface device of the computing device was used for 1 hour). The usage statistics may indicate one or more other volumes associated with use of the computing device and/or the one or more computing resources (e.g., a statistic indicating that the processor was used for an accumulated number of processor cycles).

Continuing the example of determining the price, the platform computing device may retrieve the pricing information associated with the computing device (e.g., retrieved from the database for billing information 127). The pricing information may indicate various rates, or prices, to charge for use of the one or more computing resources and/or the computing device. As some particular examples, the pricing information may indicate to charge based on time (e.g., charge $1.25 per hour of overall computing device use; or charge $0.25 per hour a processor is used and charge $0.05 per hour of a network interface device is used); to charge based on volume of use (e.g., charge 1.00 for every multiple of a threshold number of processor cycles); or some other metric to determine price based on usage. Accordingly, based on the pricing information, the one or more usage statistics may be processed to determine the price. As some particular examples, the price may be determined based a volume of time the computing device and/or the one or more computing resources were used and an indication to charge based on time (e.g., the price may be $2.50 for using the computing device for two hours; the price may be 50.60 in total for using the processor for two hours and the network interface device for one hour). The price may be determined based on various other indications of volume of use and indications to charge based on the volume of use (e.g., the price may be $3.00 based on determining that an accumulated number of processor cycles used is three times greater than the threshold number of processor cycles).

Additionally, as part of determining the price, the platform computing device may determine whether to charge for the use based on certain criteria. For example, if the accounts, users, and/or owners of the portable hardware device and the computing device respectively match each other, the platform computing device may not charge for the use of the computing device. In this way, an owner of a computing device may establish pricing information for a computing device that applies when other people, based on insertion of their portable hardware devices, use the computing device. The owner, however, may not be charged for their own use. If the platform computing device determines to not charge for the use, the price may be determined as $0.00 and then the method 400 may proceed to, or skip, step 465. If the platform computing device determines to charge for the use, the price may be determined based on the one or more third indications and the pricing information, as discussed above and then the method 400 may proceed to step 465.

At step 465, the platform computing device may bill, based on the price, an account associated with the portable hardware device. Billing the account may include updating one or more other data records for the account (e.g., updating one or more data records stored by the database for billing information 127). Billing the account may include sending, to a billing service, an indication of the price and/or the account. When the account's bill is paid, an account associated with the owner of the computing device may be paid an amount equal to the price.

Figure 5:
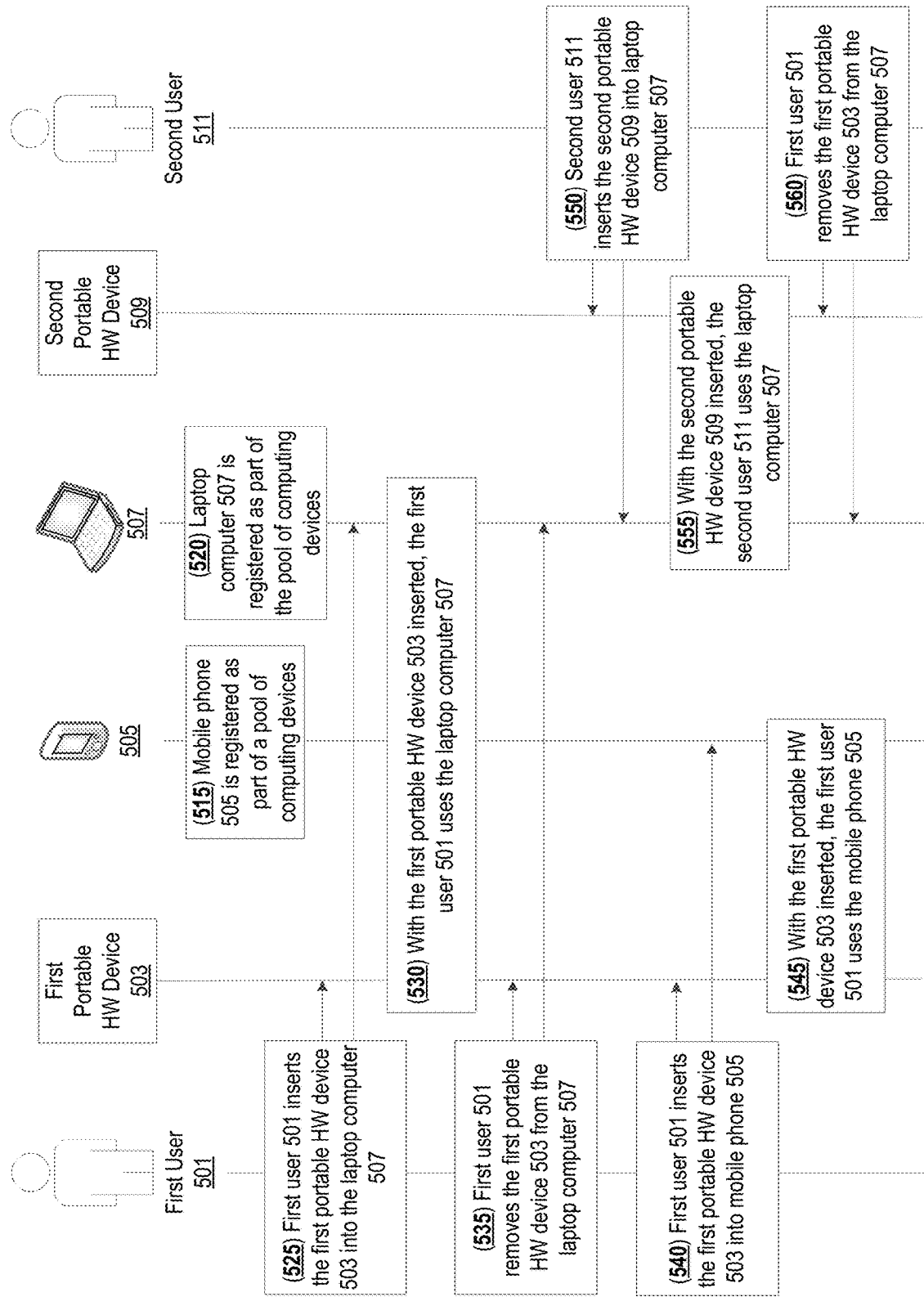
FIG. 5 depicts an example flow that includes accesses to user data based on portable hardware devices in accordance with various aspects described herein.

To illustrate the various devices in practice, an example flow will be discussed in connection with FIG. 5. In particular, FIG. 5 depicts an example flow that includes two users (users 501 and 511), each with their own portable hardware devices (devices 503 and 509), as they access user data and use one or more computing devices (mobile phone 505 and laptop computer 507). The example flow will be discussed based on the example methods 200, 300, and 400. In particular, the example flow may include the performance of methods that are the same as, or similar to, example methods 200, 300, and 400. Further, the example flow could be implemented in the example computing environment 100 of FIG. 1. For example, both portable hardware devices (devices 503 and 509) may be the same as, or similar to, the physical hardware device 101 of FIG. 1. Prior to the beginning of the example flow both users have initialized their portable hardware devices to store desired user data (e.g., as discussed in connection with step 305 of example method 300).

The example flow begins at 515, where the mobile phone 505 is registered as part of a pool of computing devices that is managed by a pool management computing platform (e.g., pool management computing platform 113). Registration of the mobile phone 505 may include various processes performed by the mobile phone 505 and the pool management computing platform (e.g., as discussed in connection with steps 205-215 of the example method 200, and in connection with steps 405-415 of the example method 400). The example flow illustrates the mobile phone 505 being used based on insertion of the first portable hardware device 503 at 540-545 of the example flow. The mobile phone 505 may be owned by the first user 501. Accordingly, the first user 501 may not be billed for any use of the mobile device 505 based on insertion of the first portable hardware device 503.

At 520, the laptop computer 507 is registered as part of the pool of computing devices. Registration of the laptop computer 507 may include various processes performed by the laptop computer 507 and the pool management computing platform (e.g., as discussed in connection with steps 205-215 of the example method 200, and with steps 405-415 of the example method 400). The example flow illustrates the laptop computer 507 being used based on insertion of different portable hardware devices. In particular, the example flow illustrates the laptop computer 507 being used based on insertion of the first portable hardware device 503 at 525-535 of the example flow. The example flow illustrates the laptop computer 507 being used based on insertion of the second portable hardware device 509 at 550-560 of the example flow. The laptop computer 507 may be owned by an enterprise that allows for both the first user 501 and the second user 511 to use the laptop computer 507. Accordingly, both the first user 501 and the second user 511 may be billed for use of the laptop computer based on their respective portable hardware devices.

At 525, the first user 501 inserts the first portable hardware device 503 into the laptop computer 507. Based on the insertion of the first portable hardware device 503, the laptop computer 507, the first portable hardware device 503, and the pool management computing platform may perform various processes (e.g., as discussed in connection with step 220 of the example method 200; with steps 310-325 of the example method 300; and with steps 420-435 of the example method 400).

At 530, the first user 501, with the first portable hardware device 503 inserted into the laptop computer 507, may use the laptop computer 507. During this use, the laptop computer 507 may be used and/or controlled by the first portable hardware device 503, and user data stored by the first portable hardware device 503 may be accessed. The first user 501 may, for example, use the laptop computer 507 to execute a browser application stored by the first portable hardware device 503 and view one or more websites (e.g., as discussed in connection with Table I). The first user 501 may, for example, use the laptop computer 507 to execute a word processing application stored by the first portable hardware device 503 and edit a document stored by the first portable hardware device (e.g., as discussed in connection with Table I). During and/or based on this use at 530, the laptop computer 507, the first portable hardware device 503, and the pool management computing platform may perform various processes (e.g., as discussed in connection with step 225 of the example method 200; with step 330 of the example method 300; and with steps 440-445 of the example method 400).

At 535, the first user 501 removes the first portable hardware device 503 from the laptop computer 507. Just prior to the removal, the first user 501 may have caused the laptop computer 507 and the first portable hardware device 503 to perform a de-coupling process that allows the first user 501 to safely disconnect (e.g., remove) the first portable hardware device 503 from the laptop computer 507. Based on this de-coupling process and the disconnection of the first portable hardware device 503, the laptop computer 507, the first portable hardware device 503, and the pool management computing platform may perform various processes (e.g., as discussed in connection with step 230 of the example method 200; with step 335 of the example method 300; and with steps 450-465 of the example method 400). Additionally, based on the use of the laptop computer 507, an account of the first user 501 may be billed (e.g., the account may be billed $3.00 for the use of the laptop computer 507). When the first user 501 pays the bill, the owner of the laptop computer 507 may be paid for the use (e.g., the $3.00 may be transferred to an account associated with the owner of the laptop computer 507).

At some point after the first portable hardware device 503 is removed from the laptop computer 503, the first user 501 inserts the first portable hardware device 503 into the mobile phone 505. Based on the insertion of the first portable hardware device 503, the mobile phone 505, the first portable hardware device 503, and the pool management computing platform may perform various processes (e.g., as discussed in connection with step 220 of the example method 200; with steps 310-325 of the example method 300; and with steps 420-435 of the example method 400).

At 545, the first user 501, with the first portable hardware device 503 inserted into the mobile phone 505, may use the mobile phone 505. During this use, the mobile phone 505 may be used and/or controlled by the first portable hardware device 503, and user data stored by the first portable hardware device 503 may be accessed. The first user 501 may, for example, use the mobile phone to execute a browser application stored by the first portable hardware device 503 and view one or more websites (e.g., as discussed in connection with Table I). The first user 501 may, for example, use the mobile phone to conduct one or more calls based on contact information stored by the first portable hardware device (e.g., as discussed in connection with Table I). Further, the mobile phone may connect to a cellular network based on the SIM of the first portable hardware device 503. During and/or based on this use at 545, the mobile device 505, the first portable hardware device 503, and the pool management computing platform may perform various processes (e.g., as discussed in connection with step 225 of the example method 200; with step 330 of the example method 300; and with steps 440-445 of the example method 400).

At 550, the second user 501 inserts the second portable hardware device 509 into the laptop computer 507. Based on the insertion of the second portable hardware device 509, the laptop computer 507, the second portable hardware device 509, and the pool management computing platform may perform various processes (e.g., as discussed in connection with step 220 of the example method 200; with steps 310-325 of the example method 300; and with steps 420-435 of the example method 400).

At 555, the second user 511, with the second portable hardware device 509 inserted into the laptop computer 507, may use the laptop computer 507. During this use, the laptop computer 507 may be used and/or controlled by the second portable hardware device 509, and user data stored by the second portable hardware device 509 may be accessed. The second user 511 may, for example, use the laptop computer 507 to execute a browser application stored by the second portable hardware device 509 and view one or more websites (e.g., as discussed in connection with Table I). During and/or based on this use at 555, the laptop computer 507, the second portable hardware device 509, and the pool management computing platform may perform various processes (e.g., as discussed in connection with step 225 of the example method 200; with step 330 of the example method 300; and with steps 440-445 of the example method 400).

At 560, the second user 511 removes the second portable hardware device 509 from the laptop computer 507. Just prior to the removal, the second user 511 may have caused the laptop computer 507 and the second portable hardware device 509 to perform a de-coupling process that allows the second user 511 to safely disconnect (e.g., remove) the second portable hardware device 509 from the laptop computer 507. Based on this de-coupling process and the disconnection of the second portable hardware device 509, the laptop computer 507, the second portable hardware device 509, and the pool management computing platform may perform various processes (e.g., as discussed in connection with step 230 of the example method 200; with step 335 of the example method 300; and with steps 450-465 of the example method 400). Additionally, based on the use of the laptop computer 507, an account of the second user 511 may be billed (e.g., the account may be billed $1.00 for the use of the laptop computer 507). When the second user 511 pays the bill, the owner of the laptop computer 507 may be paid for the use (e.g., the $1.00 may be transferred to an account associated with the owner of the laptop computer 507).

Figure 6:
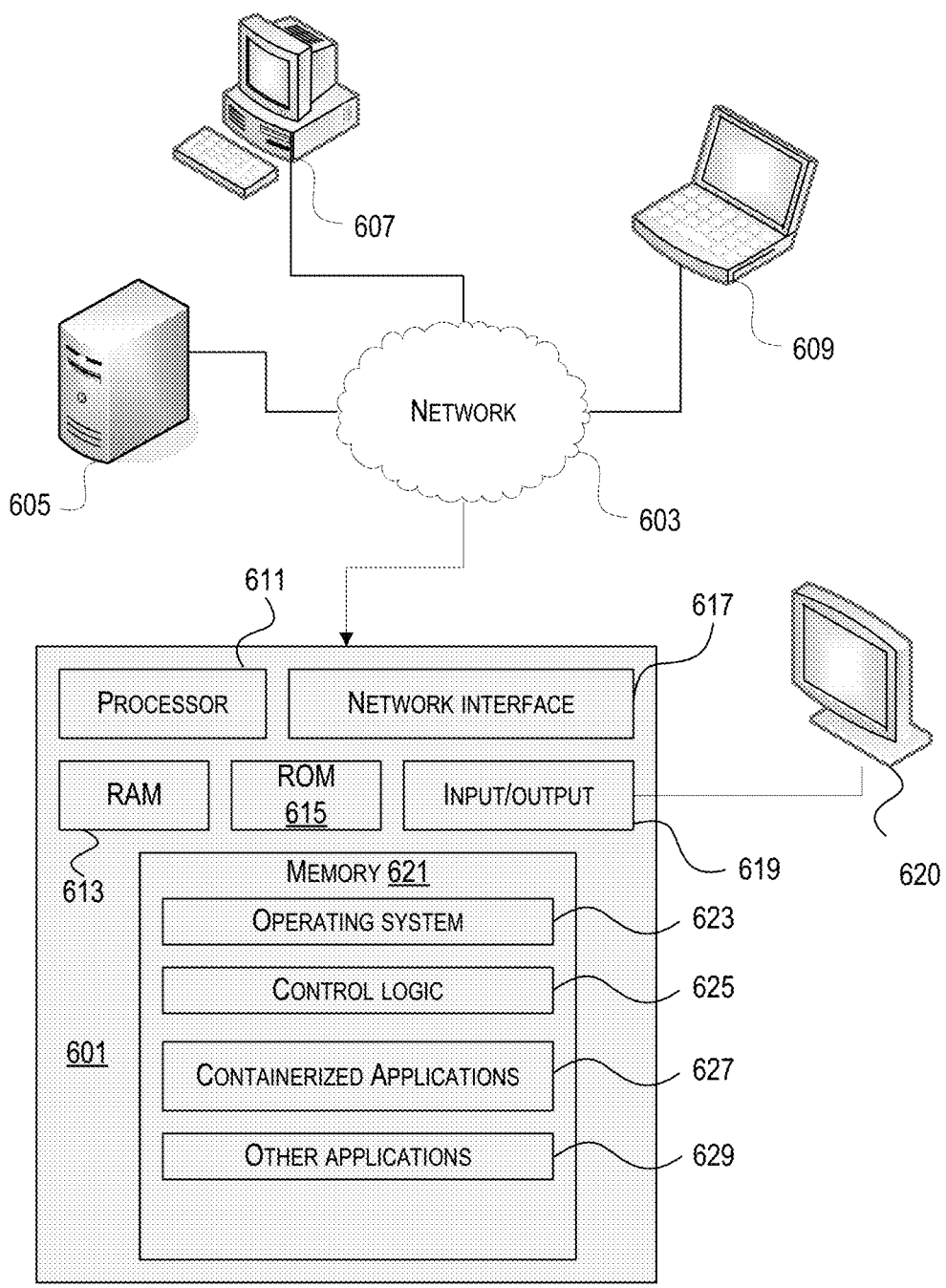
FIG. 6 depicts an example of a computing device that may be used in implementing one or more aspects described herein.

FIG. 6 illustrates one example of a computing device 601 that may be used to implement one or more illustrative aspects discussed herein. For example, the computing device 601 may implement one or more aspects of the disclosure by reading and/or executing instructions and performing one or more actions based on the instructions. The computing device 601 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 601 may operate in a standalone environment or a networked environment. As shown in FIG. 6, various network nodes 601, 605, 607, and 609 may be interconnected via a network 603, such as the Internet. Other networks may also or alternatively be used, including private intranets, corporate networks, LANs, wireless networks, personal networks (PAN), and the like. Network 603 is for illustration purposes and may be replaced with fewer or additional computer networks. A local area network (LAN) may have one or more of any known LAN topology and may use one or more of a variety of different protocols, such as Ethernet. Devices 601, 605, 607, 609 and other devices (not shown) may be connected to one or more of the networks via twisted pair wires, coaxial cable, fiber optics, radio waves or other communication media.

As seen in FIG. 6, the computing device 601 may include a processor 611, RAM 613, ROM 615, network interface 617, input/output interfaces 619 (e.g., keyboard, mouse, display, printer, etc.), and memory 621. Processor 611 may include one or more computer processing units (CPUs), graphical processing units (GPUs), and/or other processing units such as a processor adapted to perform computations associated with speech processing or other forms of machine learning. I/O 619 may include a variety of interface units and drives for reading, writing, displaying, and/or printing data or files. I/O 619 may be coupled with a display such as display 620. Memory 621 may store software for configuring computing device 601 into a special purpose computing device in order to perform one or more of the various functions discussed herein. Memory 621 may store operating system software 623 for controlling overall operation of the computing device 601, control logic 625 for instructing computing device 601 to perform aspects discussed herein, containerized applications 627, and other applications 629. The computing device 601 may include two or more of any and/or all of these components (e.g., two or more processors, two or more memories, etc.) and/or other components and/or subsystems not illustrated here.

Devices 605, 607, 609 may have similar or different architecture as described with respect to computing device

601. Those of skill in the art will appreciate that the functionality of computing device 601 (or device 605, 607, 609) as described herein may be spread across multiple data processing devices, for example, to distribute processing load across multiple computers, to segregate transactions based on geographic location, user access level, quality of service (QoS), etc. For example, devices 601, 605, 607, 609, and others may operate in concert to provide parallel computing features in support of the operation of control logic 625 and/or speech processing software 627.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A method comprising:
   receiving, by one or more first computing devices and via a network, a registration request from a second computing device;
   registering, by the one or more first computing devices, the second computing device as part of a pool of computing devices available for use by a plurality of portable hardware devices, wherein a first portable hardware device of the plurality of portable hardware devices comprises (a) memory storing user data in an encrypted form, authentication data for the first portable hardware device, and an operating system; and (b) one or more processors configured to execute the operating system;
   sending, by the one or more first computing devices via the network and for installation on the second computing device, software that is configured to interface with the first portable hardware device and is configured to enable the first portable hardware device to, based on execution of the operating system by the first portable hardware device, use one or more computing resources of the second computing device;
   receiving, by the one or more first computing devices, a first indication that indicates the first portable hardware device has been connected to the second computing device;
   storing, by the one or more first computing devices and based on the first indication, a second indication that indicates the second computing device is in use;
   receiving, by the one or more first computing devices, the authentication data;
   based on the authentication data, sending, by the one or more first computing devices and to the first portable hardware device, a decryption key for decrypting the user data into an unencrypted form;
   receiving, by the one or more first computing devices, a third indication that, based on execution of the operating system by the first portable hardware device and based on the first portable hardware device accessing the user data in the unencrypted form, indicates the one or more computing resources were used by the first portable hardware device;
   storing, by the one or more first computing devices, the third indication;
   receiving, by the one or more first computing devices, a fourth indication that indicates the portable hardware device has been disconnected from the second computing device; and
   storing, by the one or more first computing devices and based on the fourth indication, a fifth indication that indicates the second computing device is available for use by the plurality of portable hardware devices.

2. The method of claim 1, wherein the first portable hardware device comprises a hardware interface, wherein the hardware interface is configured to establish a Peripheral Control Interface Express (PCIe) bus to the second computing device based on the first portable hardware device being inserted into the second computing device, and wherein the first indication is sent based on the PCIe bus being established.

3. The method of claim 1, wherein the user data comprises a containerized application, wherein the third indication indicates usage of the one or more computing devices based on the second computing device executing code of the containerized application.

4. The method of claim 1, further comprising:
   determining, based on the third indication, a price for usage of the one or more computing resources of the second computing device; and
   billing, based on the price, an account associated with the first portable hardware device.

5. The method of claim 1, further comprising:
   registering a third computing device as part of the pool of computing devices available for use by the plurality of portable hardware devices;
   receiving a sixth indication that indicates the first portable hardware device has been connected to the third computing device;
   storing, based on the sixth indication, a seventh indication that indicates the third computing device is in use;
   receiving an eighth indication that indicates one or more computing resources of the third computing device were used by the first portable hardware device;
   receiving a ninth indication that indicates the portable hardware device has been disconnected from the third computing device; and storing, based on the ninth indication, a tenth indication that indicates the third computing device is available for use by the plurality of portable hardware devices.

6. The method of claim 1, wherein the second indication is based on a blockchain associated with the second computing device.

7. The method of claim 1, wherein the second computing device comprises a laptop computer.

8. The method of claim 1, wherein the second computing device comprises a mobile phone.

9. The method of claim 1, wherein the one or more computing resources comprise a processor, and wherein the third indication indicates that the processor was used by the first portable hardware device.

10. The method of claim 1, further comprising:
determining, based on a key rotation algorithm, the decryption key.

11. The method of claim 10, wherein the first portable hardware device is configured to delete the decryption key as part of a de-coupling process for disconnecting the first portable hardware device.

12. The method of claim 1, further comprising:
receiving a sixth indication that indicates a second portable hardware device of the plurality of portable hardware devices has been connected to the second computing device;
storing, based on the sixth indication, a seventh indication that indicates the second computing device is unavailable for use;
receiving an eighth indication that indicates the one or more computing resources of the second computing device were used by the second portable hardware device;
receiving a ninth indication that indicates the second portable hardware device has been disconnected from the second computing device; and
storing, based on the ninth indication, a tenth indication that indicates the second computing device is available for use by the plurality of portable hardware devices.

13. One or more non-transitory media storing instructions that, when executed, cause one or more first computing devices to perform steps comprising:
receiving, via a network, a registration request from a second computing device;
registering the second computing device as part of a pool of computing devices available for use by a plurality of portable hardware devices, wherein a first portable hardware device of the plurality of portable hardware devices comprises (a) memory storing user data in an encrypted form, authentication data for the first portable hardware device, and an operating system; and (b) one or more processors configured to execute the operating system;
sending, via the network and for installation on the second computing device, software that is configured to interface with the first portable hardware device and is configured to enable the first portable hardware device to, based on execution of the operating system by the first portable hardware device, use one or more computing resources of the second computing device;
receiving a first indication that indicates the first portable hardware device has been connected to the second computing device;
storing, based on the first indication, a second indication that indicates the second computing device is in use;

receiving the authentication data;
based on the authentication data, sending, to the first portable hardware device, a decryption key for decrypting the user data into an unencrypted form;
receiving a third indication that, based on execution of the operating system by the first portable hardware device and based on the first portable hardware device accessing the user data in the unencrypted form, indicates the one or more computing resources were used by the first portable hardware device;
storing the third indication;
receiving a fourth indication that indicates the portable hardware device has been disconnected from the second computing device;
storing, based on the fourth indication, a fifth indication that indicates the second computing device is available for use by the plurality of portable hardware devices;
determining, based on the third indication, a price for usage of the one or more computing resources of the second computing device; and
billing, based on the price, an account associated with the first portable hardware device.

14. The one or more non-transitory media of claim 13, wherein the first portable hardware device comprises a hardware interface, wherein the hardware interface is configured to establish a Peripheral Control Interface Express (PCIe) bus to the second computing device based on the first portable hardware device being inserted into the second computing device, and wherein the first indication is sent based on the PCIe bus being established.

15. The one or more non-transitory media of claim 13, wherein the user data comprises a containerized application, wherein the third indication indicates usage of the one or more computing devices based on the second computing device executing code of the containerized application.

16. The one or more non-transitory media of claim 13, wherein the executable instructions, when executed, cause the one or more first computing devices to perform steps comprising:
registering a third computing device as part of the pool of computing devices available for use by the plurality of portable hardware devices;
receiving a sixth indication that indicates the first portable hardware device has been connected to the third computing device;
storing, based on the sixth indication, a seventh indication that indicates the third computing device is in use;
receiving an eighth indication that indicates one or more computing resources of the third computing device were used by the first portable hardware device;
receiving a ninth indication that indicates the portable hardware device has been disconnected from the third computing device; and
storing, based on the ninth indication, a tenth indication that indicates the third computing device is available for use by the plurality of portable hardware devices.

17. The one or more non-transitory media of claim 13, wherein the second indication is based on a blockchain associated with second computing device.

18. The one or more non-transitory media of claim 13, wherein the second computing device comprises a laptop computer or a mobile phone.

19. A system comprising:
a first portable hardware device that comprises (a) memory storing user data in an encrypted form, authentication data associated with the user data, and an operating system; (b) one or more reduced instruction set architecture processors configured to execute the operating system; and (c) a hardware interface configured to form a bus between a computing device and the first portable hardware device when the first portable hardware device is inserted into the computing device; and one or more first computing devices that comprise:
one or more processors; and
first memory storing instructions that, when executed by the one or more processors, cause the one or more first computing devices to perform steps comprising:
receiving, via a network, a registration request from a second computing device;
registering the second computing device as part of a pool of computing devices available for use by a plurality of portable hardware devices, wherein the first portable hardware device is of the plurality of portable hardware devices;
sending, via the network and for installation on the second computing device, software that is configured to interface with the first portable hardware device and is configured to enable the first portable hardware device to, based on execution of the operating system by the first portable hardware device, use one or more computing resources of the second computing device;
receiving a first indication that indicates the first portable hardware device has been connected to the second computing device;
storing, based on the first indication, a second indication that indicates the second computing device is in use;
receiving the authentication data;
based on the authentication data, sending, to the first portable hardware device, a decryption key for decrypting the user data into an unencrypted form;
receiving a third indication that, based on execution of the operating system by the first portable hardware device and based on the first portable hardware device accessing the user data in the unencrypted form, indicates the one or more computing resources were used by the first portable hardware device;
storing the third indication;
receiving a fourth indication that indicates the portable hardware device has been disconnected from the second computing device;
storing, based on the fourth indication, a fifth indication that indicates the second computing device is available for use by the plurality of portable hardware devices;
determining, based on the third indication, a price for usage of the one or more computing resources of the second computing device; and
billing, based on the price, an account associated with the first portable hardware device.

20. The system of claim 19, wherein the first portable hardware device is configured to delete the decryption key as part of a de-coupling process for disconnecting the first portable hardware device.

* * * * *